J. C. EAMES.
TROLLEY WHEEL FOR ELECTRIC CARS.
APPLICATION FILED DEC. 2, 1909.

1,022,374.

Patented Apr. 2, 1912.

WITNESSES:
E. Blossfeld
H. P. Robinet

John C. Eames, INVENTOR.

UNITED STATES PATENT OFFICE.

JOHN C. EAMES, OF SAN FRANCISCO, CALIFORNIA.

TROLLEY-WHEEL FOR ELECTRIC CARS.

1,022,374.  Specification of Letters Patent.  Patented Apr. 2, 1912.

Application filed December 2, 1909. Serial No. 531,088.

*To all whom it may concern:*

Be it known that I, JOHN C. EAMES, a citizen of the United States, residing at San Francisco, county of San Francisco, and State of California, have invented certain new and useful Improvements in Trolley-Wheels for Electric Cars, of which the following is a specification.

This invention relates to trolley wheels, for electric cars, used to convey the current from the feed wire to the motor on the car.

The object is to provide a trolley wheel that can easily be repaired, will weigh less, and cost less to manufacture than those in use at the present time. Such wheels are at present made by casting in a mold using some alloy of copper; when in use the rims are rapidly worn and burned off, requiring replacement with new wheels at frequent intervals.

Applicant's device provides a skeleton frame (preferably formed from sheet metal) made in two disks or halves united by bolts, keys or rivets and a rim or tire of copper alloy or other good conducting material clamped between the two disks, together with a suitable journal bearing secured in a chamber or opening in the center of each disk. This construction forms a strong light weight wheel the journal and rim of which are quickly and easily removed and the frame will last an indefinite time.

Figure 1:
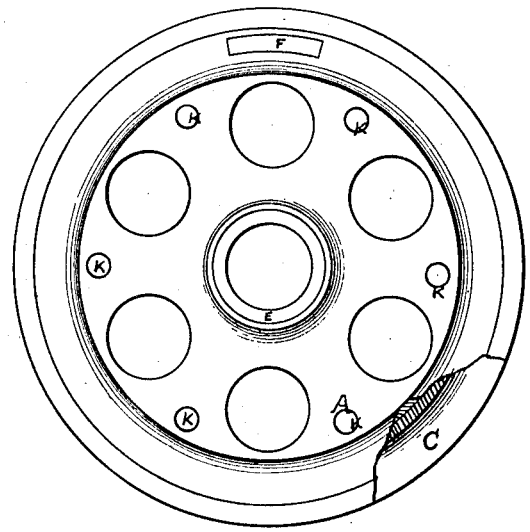
Figure 2:
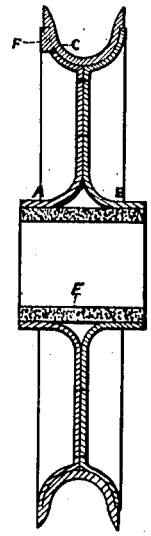
Figure 3:
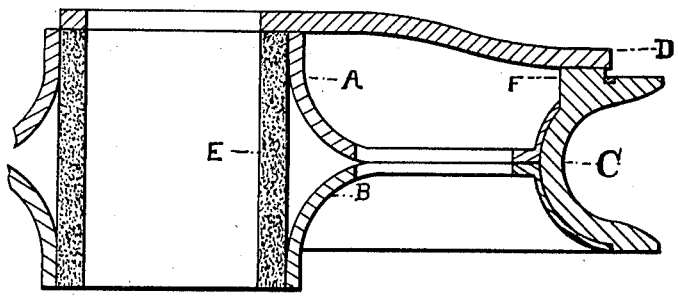

In the drawings Figure 1 is a side view, partly broken away, Fig. 2 is a vertical section through the center of the wheel. Fig. 3 is a detail view of a portion of the rim showing the contact lug for connecting the rim with the spring contact on the trolley pole.

The parts of the frame of the wheel are stamped from sheet metal and the tire is of copper alloy preferably cast in a mold in such shape that it conforms in part with the shape of the rim of the frame and preferably projects beyond the edge of it, it is evident when the tire is placed between the two disks and the parts bolted or otherwise secured, it will firmly hold the rim in position and the circular openings in the centers of the disks will form a suitable receptacle for the journal bearing, of any desirable type.

Various modifications of this method of attaching a tire or rim, of good electrical conductive quality, to a center or frame of lower cost material may be made and yet come within the scope of my invention.

The plates "A" and "B" Figs. 1, 2, 3, can be economically formed from sheet steel in a drawing press, thus forming the clamps for the tire or rim and the central bosses make a support for the journal bushing. The rim "C" (all figures) is quickly made by casting in a metal mold, forming the lug "F" integral with the rim or tire. The contact strip "D" is shown to indicate the manner in which electrical connection is usually made between the rim of the trolley wheel and the trolley pole.

The two halves of the wheel frame ("A" and "B") are united by the rivets or bolts "K."

The drawings clearly bring out the idea that the entire wheel frame is made of but two similar pieces of flat sheet metal; the center being drawn up to form a hollow cylindrical hub and the rim curved outwardly to form a U shaped periphery when the two halves are united; the two pieces therefore forming the seating for the tire and a support to the journal bearing for the shaft, or serve to attach the shaft if the latter is stationary on the wheel.

One great advantage of making the entire frame and supports out of but two pieces is that there are no small parts to get out of adjustment and break down under the severe service to which the wheels are subject.

The construction of the tire and contact strip as shown in the drawings constitutes a novel feature that is a very economical one in service as it gives a complete entire groove in one piece and at the same time allows of direct contact with the flat strip "D" which carries the current from the tire to the harp or wheel support of the trolley pole. As will be seen from the drawing the flat contact strip "D" is held against the contact lug "F" of the tire by means of the opening cut in the periphery of the rim of the frame, where it is secured in any suitable manner as by forming a groove in the end of the lug and sliding the end of strip, which is bent to clear the wheel frame, into it before securing the opposite end in friction contact with the harp of the trolley pole; or the strip may be secured to the lug by a screw or bolt.

Applicant's construction gives the most direct electrical conduction that can be secured in a built up wheel and is superior to all forms of solid wheel where the current passes through the journal bearing.

What I claim as new and desire to secure by Letters Patent of the United States is:

1. A trolley wheel comprising a frame of two disks of sheet metal having hub and concave rim formed integrally with the frame, a grooved tire of good conducting material having a contact lug formed integrally with the tire together with a contact strip to conduct the electricity directly from the tire to the trolley pole without passing through the frame and suitable rivets or bolts to unite the parts substantially as and for the purpose set forth.

2. A trolley wheel consisting of a frame made of two disks of sheet metal with hub and concave tire supports formed integrally with the disks, suitable openings in the frame for rivet or bolt connections, a hole cut through the rim, a lug that constitutes an integral portion of the tire passing through said hole, a tire of good conducting material and suitable rivets or bolts to unite the parts substantially as and for the purpose set forth.

In testimony whereof I have hereunto subscribed my name this 19th day of November A. D. 1909.

JOHN C. EAMES. [L. S.]

Witnesses:
H. P. ROBINET,
A. P. RAYE.

---

Copies of this patent may be obtained for five cents each, by addressing the "Commissioner of Patents, Washington, D. C."